United States Patent
Johann et al.

(10) Patent No.: US 9,512,727 B2
(45) Date of Patent: Dec. 6, 2016

(54) ROTOR OF AN AXIAL COMPRESSOR STAGE OF A TURBOMACHINE

(75) Inventors: Erik Johann, Berlin (DE); Frank Heinichen, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 600 days.

(21) Appl. No.: 13/431,408

(22) Filed: Mar. 27, 2012

(65) Prior Publication Data

US 2012/0251324 A1    Oct. 4, 2012

(30) Foreign Application Priority Data

Mar. 28, 2011 (DE) .................. 10 2011 006 273

(51) Int. Cl.
| | |
|---|---|
| F01D 5/14 | (2006.01) |
| F01D 5/34 | (2006.01) |
| F01D 5/10 | (2006.01) |

(52) U.S. Cl.
CPC .............. *F01D 5/143* (2013.01); *F01D 5/10* (2013.01); *F01D 5/34* (2013.01); *F05D 2240/80* (2013.01); *F05D 2250/711* (2013.01); *F05D 2250/713* (2013.01); *F05D 2250/73* (2013.01); *F05D 2260/96* (2013.01); *Y02T 50/671* (2013.01); *Y02T 50/673* (2013.01)

(58) Field of Classification Search
CPC ............ F01D 5/143; F01D 5/34; F01D 5/10; F05D 240/80; F05D 2200/26; F05D 2200/261; F05D 2200/262; F05D 2200/263; F05D 2200/264; F05D 2250/711; F05D 2250/73; F05D 2250/713; F05D 2260/96; F04D 29/329; Y02T 50/673; Y02T 50/671
USPC ....................................................... 416/193 A
See application file for complete search history.

(56) References Cited

U.S. PATENT DOCUMENTS

| | | |
|---|---|---|
| 3,890,060 A | 6/1975 | Lipstein |
| 4,531,362 A | 7/1985 | Barry et al. |
| 4,540,335 A | 9/1985 | Yamaguchi et al. |
| 5,067,876 A | 11/1991 | Moreman, III |

(Continued)

FOREIGN PATENT DOCUMENTS

| | | |
|---|---|---|
| DE | 4108930 | 10/1991 |
| DE | 3521798 | 8/1992 |

(Continued)

OTHER PUBLICATIONS

European Search Report dated May 12, 2014 for related European Application No. 12164964.

(Continued)

*Primary Examiner* — Dwayne J White
*Assistant Examiner* — Adam W Brown
(74) *Attorney, Agent, or Firm* — Shuttleworth & Ingersoll, PLC; Timothy Klima (57) ABSTRACT

The present invention relates to a rotor of an axial compressor stage of a turbomachine featuring a rotor assembly with a rotary axis, forming on its circumference a blade ring with a radially outer ring surface, and several rotor blades arranged on the blade ring. It is provided that the ring surface between two adjacent rotor blades has at least in a partial area a changing radius relative to the rotary axis of the rotor assembly both in the axial direction and in the circumferential direction.

14 Claims, 7 Drawing Sheets

(56) References Cited

U.S. PATENT DOCUMENTS

| | | | |
|---|---|---|---|
| 5,137,419 | A | 8/1992 | Waterman |
| 5,725,353 | A | 3/1998 | Matheny et al. |
| 5,950,308 | A | 9/1999 | Koff et al. |
| 6,017,186 | A * | 1/2000 | Hoeger et al. ............... 415/181 |
| 6,283,713 | B1 * | 9/2001 | Harvey et al. ........... 416/193 A |
| 6,290,458 | B1 | 9/2001 | Irie et al. |
| 6,409,469 | B1 | 6/2002 | Tse |
| 6,561,761 | B1 | 5/2003 | Decker et al. |
| 6,736,594 | B2 | 5/2004 | Irie et al. |
| 6,969,232 | B2 | 11/2005 | Zess et al. |
| 7,134,842 | B2 | 11/2006 | Tam et al. |
| 7,220,100 | B2 | 5/2007 | Lee et al. |
| 7,354,243 | B2 | 4/2008 | Harvey |
| 7,909,570 | B2 | 3/2011 | Durocher et al. |
| 8,192,154 | B2 * | 6/2012 | Sonoda et al. ............... 415/191 |
| 8,439,643 | B2 * | 5/2013 | Kuhne et al. ............ 416/193 A |
| 8,678,740 | B2 | 3/2014 | Praisner et al. |
| 8,684,684 | B2 | 4/2014 | Clements et al. |
| 8,690,523 | B2 | 4/2014 | Guemmer |
| 8,721,280 | B2 | 5/2014 | Nakagawa et al. |
| 2002/0127108 | A1 * | 9/2002 | Crall et al. ............... 416/213 R |
| 2005/0111968 | A1 | 5/2005 | Lapworth |
| 2006/0140768 | A1 | 6/2006 | Tam et al. |
| 2007/0059177 | A1 | 3/2007 | Harvey |
| 2007/0160459 | A1 | 7/2007 | Tudor |
| 2007/0224038 | A1 | 9/2007 | Solomon et al. |
| 2007/0258810 | A1 * | 11/2007 | Aotsuka et al. ............... 415/206 |
| 2007/0258819 | A1 | 11/2007 | Allen-Bradley et al. |
| 2008/0199306 | A1 | 8/2008 | Lebret |
| 2008/0232968 | A1 | 9/2008 | Nguyen |
| 2009/0246007 | A1 | 10/2009 | Johann |
| 2010/0014956 | A1 | 1/2010 | Guemmer |
| 2010/0098536 | A1 | 4/2010 | Guemmer |
| 2010/0172749 | A1 * | 7/2010 | Mitsuhashi ............. F01D 5/143 415/193 |
| 2011/0189023 | A1 * | 8/2011 | Guimbard et al. ....... 416/223 R |
| 2012/0201692 | A1 | 8/2012 | Boston et al. |

FOREIGN PATENT DOCUMENTS

| | | |
|---|---|---|
| DE | 69728500 | 8/2004 |
| DE | 60130577 T2 | 6/2008 |
| DE | 102007056953 | 5/2009 |
| DE | 102008021053 | 10/2009 |
| DE | 102008052401 | 4/2010 |
| EP | 1199439 | 4/2002 |
| EP | 1239116 | 9/2002 |
| EP | 1760257 | 3/2007 |
| EP | 1783346 | 5/2007 |
| EP | 2096316 | 9/2009 |
| EP | 1087100 | 4/2010 |
| EP | 2180195 | 4/2010 |
| GB | 2245312 | 1/1992 |
| GB | 2281356 | 3/1995 |
| GB | 2408546 | 6/2005 |
| WO | 9534745 | 12/1995 |
| WO | 2008046389 | 4/2008 |
| WO | WO 2009112776 A2 * | 9/2009 |
| WO | 2009129786 | 10/2009 |
| WO | 2011022111 | 2/2011 |
| WO | 2011039352 | 4/2011 |

OTHER PUBLICATIONS

European Search Report dated Dec. 3, 2014 from counterpart app No. EP 12161401.

European Search Report dated Jun. 16, 2014 from related European application No. 12161404.4.

F. Taremi and S.A. Sjolander and T.J. Praisner, Application of Endwall Contouring to Transonic Turbine Cascades: Experimental Measurements at Design Conditions, Proceedings of ASME Turbo Expo 2011, GT2011-46511, Jun. 5-10, 2011, Vancouver, Bristish Columbia, Canada.

F. Heinichen, V. Guemmer, A. Plas & H.-P. Schiffer, Numerical Investigation of the Influence of Non-Axisymmetric Hub Contouring on the Performance of a Shrouded Axial Compressor Stator, CEAS Aeronautical Journal, ISSN 1869-5582, vol. 2, pp. 89-98, Combined 1-4, 2011.

E. Dick, Fundamentals of Turbomachines, Fluid Mechanics and Its Applications, Springer, pp. 254-263, ISBN 978-94-017-9626-2, 2015.

Herausgegeben Von Prof. Dr. Ing. Habil, Heinz M. Hiersig, VDI-Lexikon Maschinenbau, Lexicon Mechanical Engineering published by The Association of German Engineers, p. 193-194, 1995.

European Examination Report dated Oct. 26, 2015 for related European Patent Application No. 12 164 964.4.

European Examination Report dated Feb. 10, 2016 for related European application No. 12161404.4.

* cited by examiner

ROTOR OF AN AXIAL COMPRESSOR STAGE OF A TURBOMACHINE

This application claims priority to German Patent Application DE102011006273.4 filed Mar. 28, 2011, the entirety of which is incorporated by reference herein.

This invention relates to a rotor of an axial compressor stage of a turbomachine. Rotors of this type are used for example in jet engines.

Axial compressors usually consist of a plurality of compressor stages each including a rotor and a stator connected directly behind one another. A plurality of aerodynamically shaped elements, referred to as rotor blades, are arranged on the rotor. A plurality of aerodynamically shaped elements, referred to as stator vanes, are likewise arranged on the stator. The rotor blades and the stator vanes are provided alternatingly in a flow duct of the compressor.

A rotor configuration is known from the publication EP 1 087 100 B1 in which the outer surface of the circumferential ring of the rotor has a concave curvature in the area between two rotor blades. This is intended to improve the low cycle fatigue of the circumferential ring.

There is a need for technical solutions that improve the flow in the blade duct between two each rotor blades of a rotor. In particular, an attempt must be made to reduce unfavourable vibration modes of rotor assembly and rotor blades of a rotor and thereby to attenuate any blade excitation.

In a rotor with a rotor assembly forming on its circumference a blade ring with a radially outer ring surface, the ring surface between two adjacent rotor blades has at least in a partial area a changing radius relative to the rotary axis of the rotor assembly bath in the axial direction and in the circumferential direction.

The solution in accordance with the invention thus provides that the surface between two rotor blades is contoured three-dimensionally. In particular, it is provided that the radius of the ring surface changes both in the axial direction (i.e. in the flow direction) and in the circumferential direction of the rotor. This means that—in at least one partial area of the ring surface—adjacent points of the ring surface have both in the circumferential direction and in the axial direction a different distance to the rotary axis of the rotor assembly.

The three-dimensional contouring of the ring surface in accordance with the invention dispenses with the symmetry restrictions predominating in the state of the art for the design of the ring surface. The result of this is new degrees of freedom in the design of the ring surface, permitting the flow in the blade duct to be favourably influenced. Unfavourable vibration modes of the rotor assembly, designed in one variant as a disk or bladed disk (=BLISK), can be reduced or even suppressed here by the three-dimensional contouring of the ring surface. In the same way, any loading from coupled vibration modes of the rotor assembly with the rotors can be reduced, so that overall the blade excitation can be attenuated.

The solution in accordance with the invention thus permits, with the same compressor design, a reduction of the maximum loading of the compressor blades, and in one design variant an even distribution of the area of maximum stress to the rotors on the pressure side and the suction side, and without the necessity of tilting the blades (so-called "blade lean"). The invention provides an optimized design with lower weight and potentially longer service life.

Rotors in accordance with the invention can in any event be manufactured using BLISK technology without extra costs, since the rotors are in any case machined from the solid. This allows the ring surface to undergo a three-dimensional contouring without extra production technology expenditure.

It is pointed out that the three-dimensional contouring of the ring surface in the area of a rotor blade arranged or provided on the rotor assembly is by its nature interrupted, since the rotor blade is arranged in this area. The transition between the ring surface and the rotor blades can be designed here unsteady (as an edge) or steady (by providing a fillet radius) in the mathematical sense. Any transition areas present which incorporate a fillet radius between the ring surface and a rotor blade represent here in the meaning of the present invention a partial area of the rotor blade, and not a partial area of the ring surface. Since transition areas of this type have a defined fillet radius, they are clearly distinguishable from the ring surface. Surface areas of a blade ring axially in front of and/or axially behind and/or in the circumferential direction between the rotor blades are thus referred to as the ring surface in the meaning of the present invention, but not the rotor blades themselves nor transition areas to the rotor blades.

It is furthermore pointed out as a precaution that the change in the radius in accordance with the invention both in the axial direction and in the circumferential direction is so important that it is outside the tolerance range for surface machining. The contouring in accordance with the invention provides a flow-influencing three-dimensional contouring of the ring surface.

In an embodiment of the invention, it is provided that for at least one section through the blade ring in a plane vertical to the rotary axis of the rotor assembly, the resulting surface line between two rotor blades has at least in some sections a steadily changing radius. If a cylinder coordinate system is considered with the three coordinates of a) circumferential angle ($\phi$), b) distance ($r$) from the rotary axis and c) coordinate in the axial direction ($x$), then a section through the blade ring in a plane vertical to the rotary axis of the rotor assembly corresponds to a section through the ring surface with a fixed axial value ($x$). With the stated variant of the invention, it is in other words the case that in the surface line the radius ($r$) between two rotor blades steadily changes depending on the circumferential angle ($\phi$). A curve of this type in the circumferential direction applies for at least some axial values ($x$) and in one embodiment for all axial values ($x$), i.e. for the entire ring surface.

In a further embodiment of the invention, it is provided that for at least one section through the blade ring in a plane vertical to the rotary axis of the rotor assembly, the resulting surface line in the area between two rotor blades is asymmetrical. A symmetrical course in the circumferential direction between two rotor blades is dispensed with in this design variant, the consequence being greater design latitude. The fact that the stated feature should apply for at least one section means that it applies for one of the possible sections, a minority of the possible sections, a majority of the possible sections or all sections, where it is assumed that two sections are identical provided they do not have a minimum distance from one another.

In one design variant of this it is provided that the ring surface adjoining the suction side of the one rotor blade has higher radii than that adjoining the pressure side of the other, adjacent rotor blade. Thus a convex elevation or a peak is created on the suction side, while on the pressure side a convex depression or valley is provided. As a result it can be achieved in one design variant that stresses on the pressure side and the suction side are distributed more evenly.

In a further design variant, it is provided that for at least one section through the blade ring in a plane vertical to the rotary axis of the rotor assembly, the resulting surface line between two rotor blades in at least one section has a convex bulge. Thus at least in one partial area of the ring surface a peak is formed between two adjacent rotor blades.

A variation of the radius of the ring surface is in accordance with the invention also present in the axial direction. In the following, a number of exemplary embodiments for a corresponding surface contouring in the axial direction are considered, with a longitudinal section through the blade ring and the resulting surface line between an axially front face and an axially rear face of the blade ring being considered in each case. A longitudinal section of this type corresponds in the case of a consideration in cylinder coordinates to a section with constant or substantially constant circumferential angle ($\phi$). The axially front face can also be referred to as blade leading edge and the axially rear face as blade trailing edge of the blade ring. The terms "front" and "rear" relate here to the flow direction.

In an embodiment, it is provided that the resulting surface line between a front face and an axially rear face has at least in some sections a steadily changing radius.

In a further embodiment, it is provided that the resulting surface line between a front face and an axially rear face in at least one section has a convex bulge, i.e. is designed as a peak. A design variant of this provides that the surface line in the direction of the blade trailing edge initially passes through a minimum and then a maximum. For the ring surface, this means that it passes in the direction of the blade trailing edge first through a valley and then a peak. As a result the gas flow is introduced in a favourable way into the blade duct.

The three-dimensional design in accordance with the invention, which dispenses with symmetries in the area of the surface design between two rotor blades, permits in general terms any number of degrees of freedom for surface design. In an embodiment of the invention, it is provided that this large number is reduced in that a first surface line of a first section through the blade ring in a plane vertical to the rotary axis of the rotor assembly conforms to a sine function, a cosine function or to a combination of sine and cosine functions. At least one second surface line of a second section through the blade ring adjacent to the first section obeys the same function, with however a different phase position being provided relative to the first surface line.

In other words, each section through the ring surface in a plane vertical to the rotary axis of the rotor assembly has a surface line defined by one or more sine or cosine functions or their combination. In the case of sections through the ring surface made with other axial values (x), the same trigonometric functions apply. Only the phase position and/or the amplitude is varied depending on the axial position (x). As a result, the number of degrees of freedom is reduced, in one embodiment to 2 to 5. This permits for example a comparatively simpler programming of a metal-cutting machine, using which a BLISK is machined from the solid under computer control.

According to a further design variant, the ring surface on the axially front and/or the axially rear face of the blade ring is designed continuously circular. At the inlet side and/or the outlet side of the blade ring, a circular rim with fixed radius is provided. The three-dimensional contouring flattens off accordingly towards the faces of the blade ring. This provides a loss-free transition from one blade row to an adjoining blade row.

It is provided in an embodiment of the invention that the ring surface between all rotor blades of the rotor has the same three-dimensional contour in each case. The arrangement is symmetrical relative to a rotation about an angle corresponding to the distance between two rotor blades.

The considered rotor assembly can be designed as a disk or as a drum, for example. In one design variant it is, as already mentioned, designed in BLISK technology.

The present invention is described in the following in light of the figures of the accompanying drawing, showing several embodiments. In the drawing.

Figure 1:
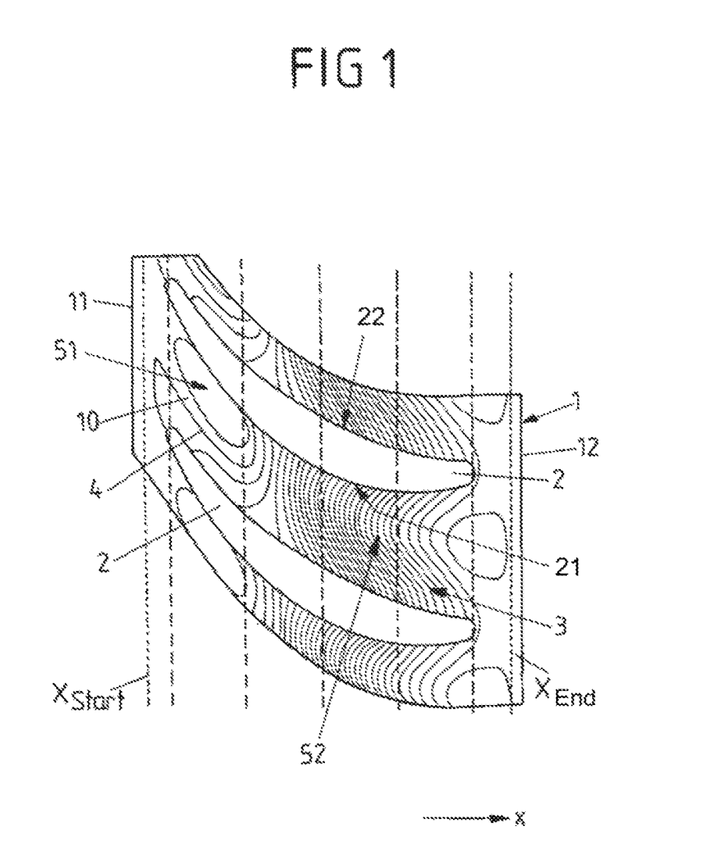
FIG. 1 shows a plan view in the radial direction onto a partial area of a rotor featuring a blade ring with a three-dimensionally contoured ring surface.

FIG. 1 shows a plan view onto a partial area of a blade ring 1 of a rotor developed in the drawing plane. The blade ring 1 has an axially front face 11 and an axially rear face 12, between which extends an outside surface of the blade ring 1, hereinafter referred to as ring surface 10. Several rotor blades 2 are arranged on the blade ring 1. Two adjacent rotor blades 2 form between them a blade duct 3 forming a part of an annular space provided between the blade ring 1 and a circumferential casing (not shown).

Each rotor blade 2 has a suction side 21 and a pressure side 22. The blade duct 3 between two rotor blades 2 is delimited laterally by the suction side 21 of the one rotor blade 2 and by the pressure side 22 of the other rotor blade 2. In the radial direction, the blade duct 3 is delimited radially inwards by the ring surface 10 and radially outwards by the surface of a casing, not shown.

The ring surface 10 is three-dimensionally contoured, i.e. it has changing radii both in the axial and circumferential directions. The radius change is steady in the mathematical sense, i.e. it has no discontinuities. The three-dimensional contouring is indicated by the contour lines 4 shown in FIG. 1, with the respective contour lines indicating lines with constant radius. The radius relates to the radial distance to the rotary axis of the rotor forming the blade ring (cf. in this connection also FIG. 4 below).

From the representation of the contour lines 4 it is clear that the ring surface in the axial direction x (and here following the curvature of the rotor blades 2) initially passes through a concave indentation or valley 51 and then a convex raised area or peak 52. It can also be seen that the contouring in the circumferential direction between two rotor blades 2 is not symmetrical. In particular, the peak 52 is located closer to the suction side 21 of the respective rotor blade 2 than to the pressure side 22.

It can furthermore be seen from FIG. 1 that the three-dimensional contouring of the ring surface 10 does not already start at the faces 11, 12 of the blade ring 1. At the faces 11, 12 the blade ring 1 is designed circular, so that at the inlet side and at the outlet side a rotation-symmetrical edge with fixed radius is provided.

The three-dimensional contouring starts only from an axial value $x_{start}$ (indicated by a dotted line), and it ends at an axial value $x_{end}$.

A circular rim with constant radius at the axially front face 11 and at the axially rear face 12 is implemented here in one embodiment of the invention, however not necessarily, in order to assure a transition as loss-free as possible from one blade row to the next blade row.

Figure 2:
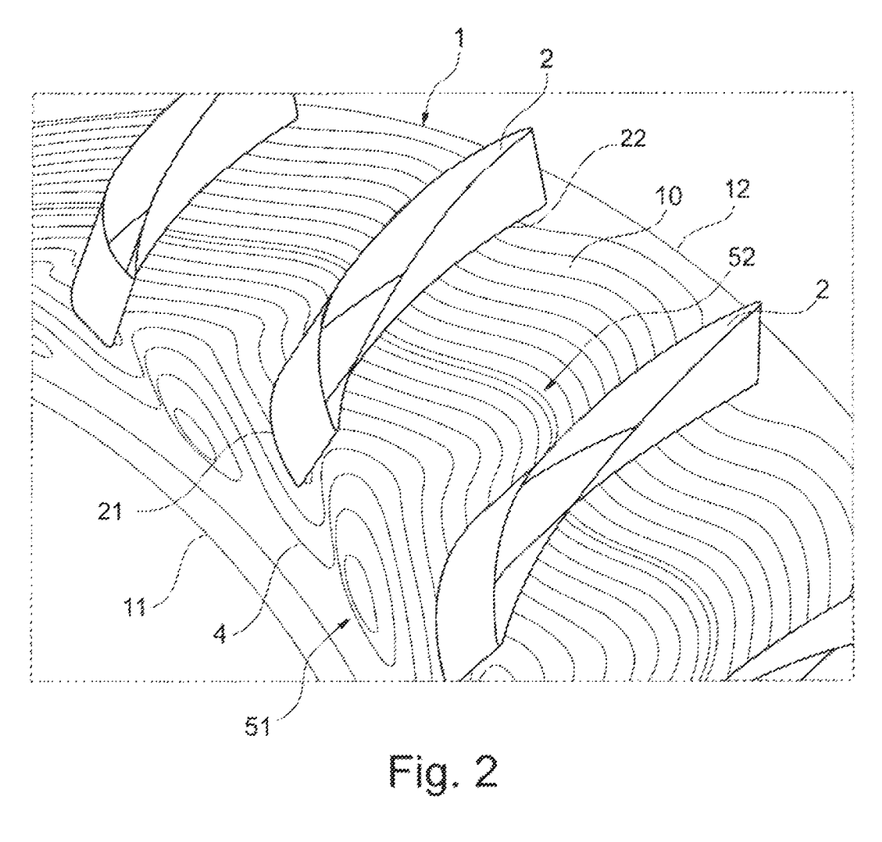
FIG. 2 shows a perspective view of a further exemplary embodiment of a rotor featuring a blade ring with a three-dimensionally contoured ring surface.

FIG. 2 shows a further three-dimensional contouring of a ring surface 10 of a blade ring 1 in a perspective view. A similar but not identical contouring is implemented here as in the exemplary embodiment of FIG. 1. Here too, several rotor blades 2 can be discerned which each have a suction side 21 and a pressure side 22 due to their curvature. The rotor blades 2 are provided on a blade ring 1 with a blade surface 10. It can also be provided, as in the exemplary embodiment of FIG. 1, that the blade ring 2 is part of a BLISK, with the rotor blades 2 thus being designed in one piece with the rotor assembly of the rotor forming the blade ring 1.

With the three-dimensional surface contouring of FIG. 2 too, a concave depression 51 and a convex elevation 52 are provided. The three-dimensional contouring flattens off towards the axial faces 11, 12, so that in these faces 11, 12 a circular rim with constant radius is present. It is however pointed out that in other exemplary embodiments it can be provided that the three-dimensional contouring extends up to the faces 11, 12.

The contouring shown, with a concave depression 51 at the start of the blade duct formed by two rotor blades 2 each and with a convex elevation 52 located in the axial direction behind the depression 51, improves the flow inside the blade duct, since the inflowing air can flow by means of the depression 51 at the start of the blade duct with low losses into said duct. In addition to the improved aerodynamics, the contouring allows a reduction of unfavourable vibration modes at the rotor assembly and rotor blades 2, and as a result attenuation of blade excitation.

At the same time it is pointed out that the three-dimensional contouring shown in FIGS. 1 and 2 must be understood only as an example. Thanks to dispensing with symmetries required in the state of the art when designing the ring surface, degrees of freedom result for the design of the ring surface which can also lead to different contouring forms. For example, it can be provided that the ring surface has depressions and elevations which are provided elsewhere in a different size and in different number. It is furthermore pointed out that a three-dimensional contouring can also be achieved by a ramp function not having any minimum and maximum values. With a ramp function, the radius in the axial direction increases linearly or substantially linearly. It can also be provided that a ramp function of this type is superimposed over a more complex three-dimensional contouring.

Figure 3A:
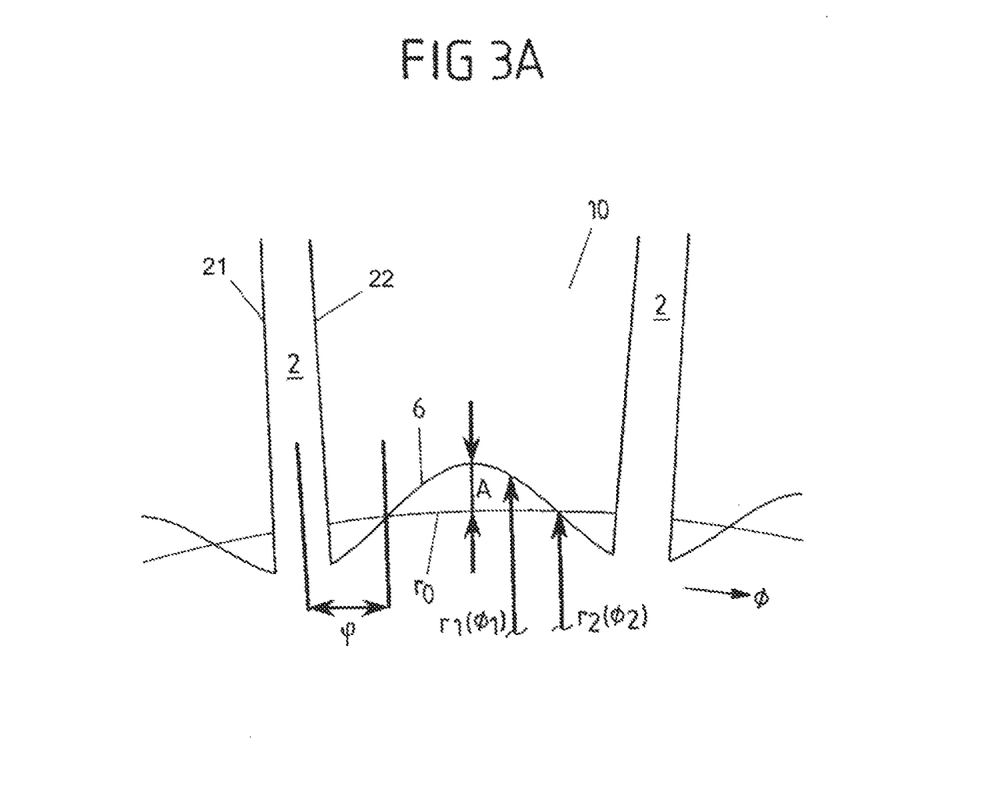
FIG. 3A shows in schematic form a view in the flow direction towards a section transverse to the rotary axis of a rotor with a three-dimensionally contoured ring surface, with the variation of the radius of the ring surface being shown.

FIG. 3A shows in schematic form, using a sectional view extending transversely to the rotary axis of the rotor, an exemplary embodiment of a three-dimensional contouring of a ring surface. Two rotor blades 2, each with a suction side 21 and a pressure side 22 can be discerned. Between them the surface 10 of the blade ring is contoured. The section shown results in a surface line 6 showing the variation of the radius r in the circumferential direction $\phi$. The representation is made in the cylinder coordinate system, where the circumferential angle $\phi$ and the distance r from the rotary axis (not shown) of the rotor are stated. The radius r has a mean value $r_0$, about which the current radius r varies depending on the circumferential angle $\phi$. FIG. 3 shows here two typical radii $r_1$, $r_2$ for the circumferential angles $\phi_1$ and $\phi_2$.

In the exemplary embodiment shown, the surface line 6 follows a sine or a cosine function. This is distinguished by a period length, a phase position $\phi$ and an amplitude A relating to the average radius $r_0$. It applies here that the radius r can assume values between $r_0+A$ and $r_0-A$ and varies between these values. The period length is selected such that it is equal to the rotor blade pitch. The angle $\phi$ indicates the phase position of the trigonometric function 6.

Instead of an individual sine or cosine function as shown in FIG. 3A, a combination of sine and cosine functions can also be used, each having a certain period length, a certain amplitude and a certain phase position. The period length is here in one design variant identical for all combined functions and corresponds to the rotor blade pitch.

Modelling of the three-dimensional surface 10 by means of trigonometric functions permits in a simple manner, i.e. by using a few parameters, the design of the surface 10. This is particularly advantageous when programming a metal-cutting machine, using which the ring surface 10 is contoured.

In an embodiment, it is provided that the entire ring surface 10 or at least a partial area is designed by means of the same trigonometric functions, in the exemplary embodiment of FIG. 3A by means of the trigonometric function 6. To do so, it is provided that only the phase position $\phi$ and/or the amplitude is varied depending on the axial distance x. Thus the same trigonometric function 6 or the same combination of trigonometric functions applies to all sections through the ring surface 10 with differing axial values of x. Only the phase position and/or the amplitude A depend on the axial value x.

It should be noted that by a gradual reduction of the amplitude A towards the axial faces 11, 12 a circular form can be achieved at the faces 11, 12 in a simple manner.

In a design variant, it can be provided that in addition an amount is added to the amplitude A in linearly dependent manner on the axial value x, for example in order to achieve three-dimensional contouring in conjunction with a rising ramp in the direction of the rear face 12.

The use of sine and cosine functions or their combination permits in a simple manner a parameterization of the three-dimensional contour of the ring surface 10. The parameters using which the three-dimensional contour of the ring surface 10 can be mathematically described are reduced to a small number. This corresponds to a reduction of the available degrees of freedom. It is possible to already obtain a very good design of the wall surfaces with the described parameterization. In an embodiment, the number of parameters/degrees of freedom is two to five.

Figure 3B:
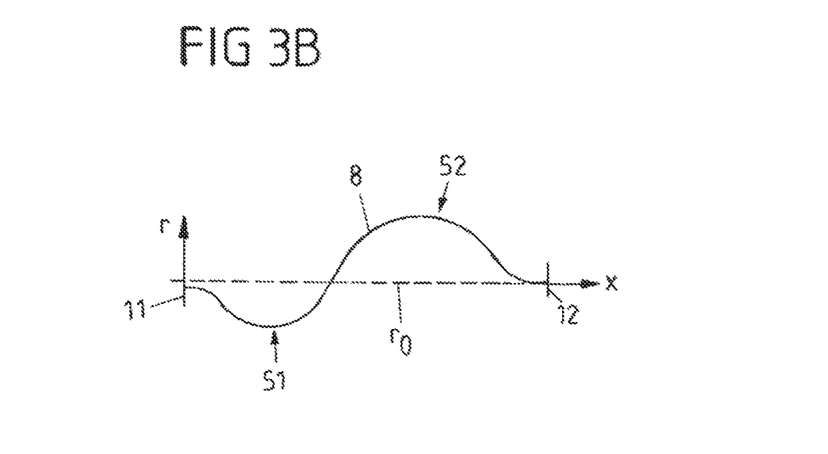
FIG. 3B shows in schematic form a longitudinal section through a blade ring with a three-dimensionally contoured ring surface.

FIG. 3B shows in schematic and exemplary form a longitudinal section through a three-dimensionally contoured blade ring. The resultant surface line 8 indicates the radius r as a function of the axial value x. The representation again uses cylinder coordinates, namely the cylinder coordinates r and x.

It can be seen here that the surface line 8 initially has values below the average radius $r_0$. This corresponds to a valley 51 shown in FIGS. 1 and 2. In the further course, the surface line 8 assumes values above the average radius $r_0$. This corresponds to a peak 52 shown in FIGS. 1 and 2. The form of the surface line 8 results from the values for A and $\phi$ as a function of x for the parameterization explained in relation to FIG. 3A.

The sections shown in FIGS. 3A and 3B define as examples three-dimensional structures that define a steadily changing radius in the circumferential direction and in the axial direction. The surface lines 6, 8 defined in the sectional representations of FIGS. 3A, 3B, and hence the ring surface 10 overall, can here be designed asymmetrical relative to the arrangement of two adjacent rotor blades 2 each. In exemplary embodiments, the ring surface runs at least in partial areas both in the circumferential direction and in the axial direction asymmetrically. It is also provided in one exemplary embodiment that the three-dimensional surface structuring is such that the ring surface 10 in the area between two rotors 2 forms at least one convex raised area. This can be achieved singly or in combination with one or more concave depressions.

Figure 4:
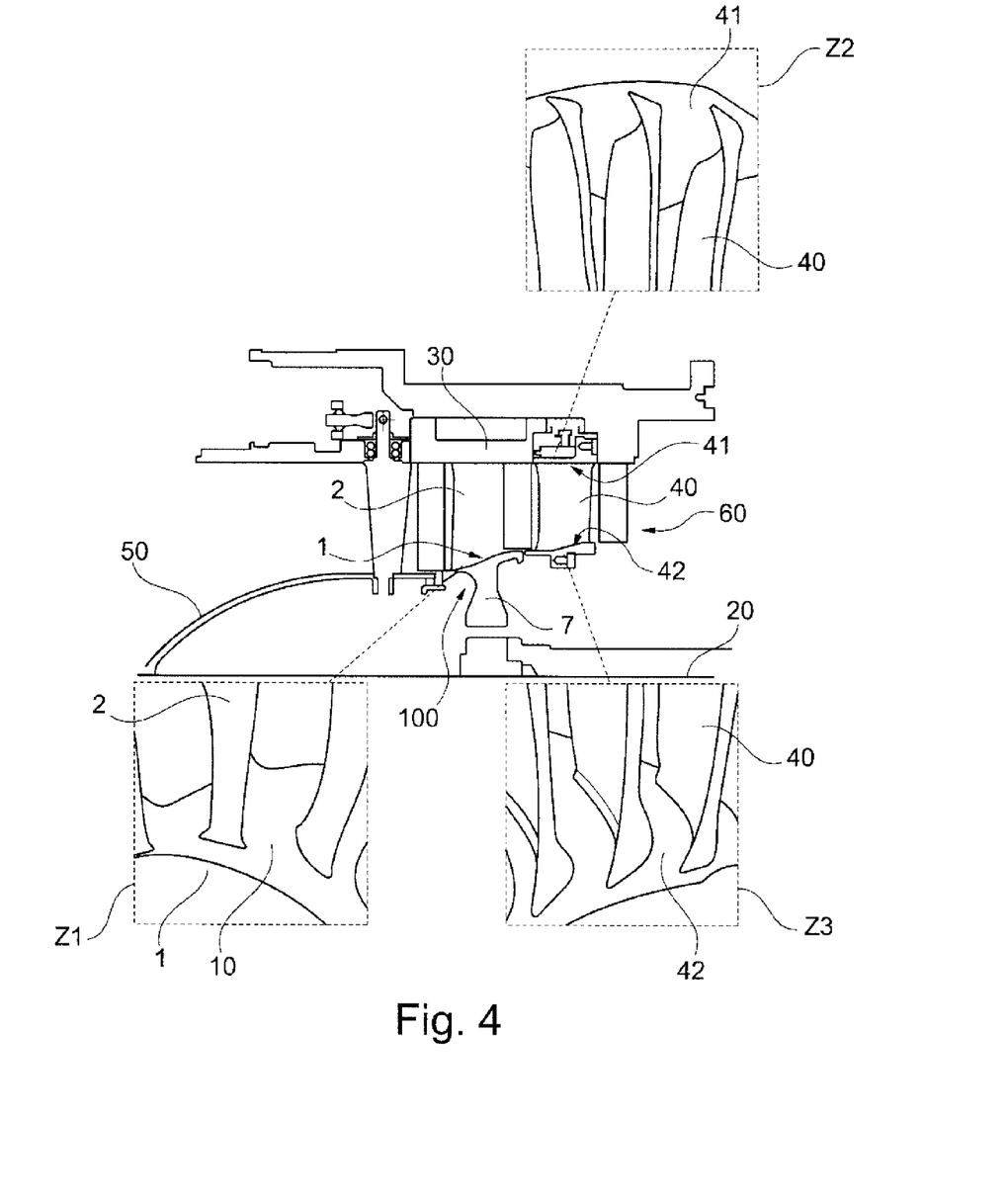
FIG. 4 shows a longitudinal section through an exemplary embodiment of a compressor of a jet engine, with three-dimensionally contoured surfaces being shown on the rotor and on the stator of the compressor.

FIG. 4 shows in a sectional view the initial area of an exemplary embodiment of a jet engine, with an inlet cone 50 with a row of inlet stator vanes and an adjoining compressor 60 being shown.

The compressor 60 includes rotors and stators, with the rotors rotating about a central rotary axis 20. FIG. 4 shows a rotor 100 including a rotor assembly designed as a disk 7 with a blade ring 1 and rotor blades 2 arranged thereon. The blade ring 1 has a three-dimensionally contoured ring surface 10, as described in the above. The detailed view Z1 shows in a perspective view the blade ring 1 with the three-dimensionally contoured ring surface 10 and rotor blades 2.

In the exemplary embodiment of FIG. 4 it is provided that the stators 40 too form three-dimensionally contoured surfaces delimiting a stator vane duct radially inwards and radially outwards. Hence a three-dimensional structuring is provided both on a radially outer surface 41 on the casing side and on a radially inner surface 42 on the hub side, said structuring like the structuring of the ring surface 10 having changing radii both in the axial direction and in the circumferential direction. A three-dimensional contouring of this type also in the area of the stator 40 is however only optional. It can, if available, be provided both on the two surfaces 41, 42 and on only one of these surfaces 41, 42. The details Z2 and Z3 of FIG. 4 show in each case the three-dimensionally contoured surfaces 41, 42 in the stator area.

Figure 5:
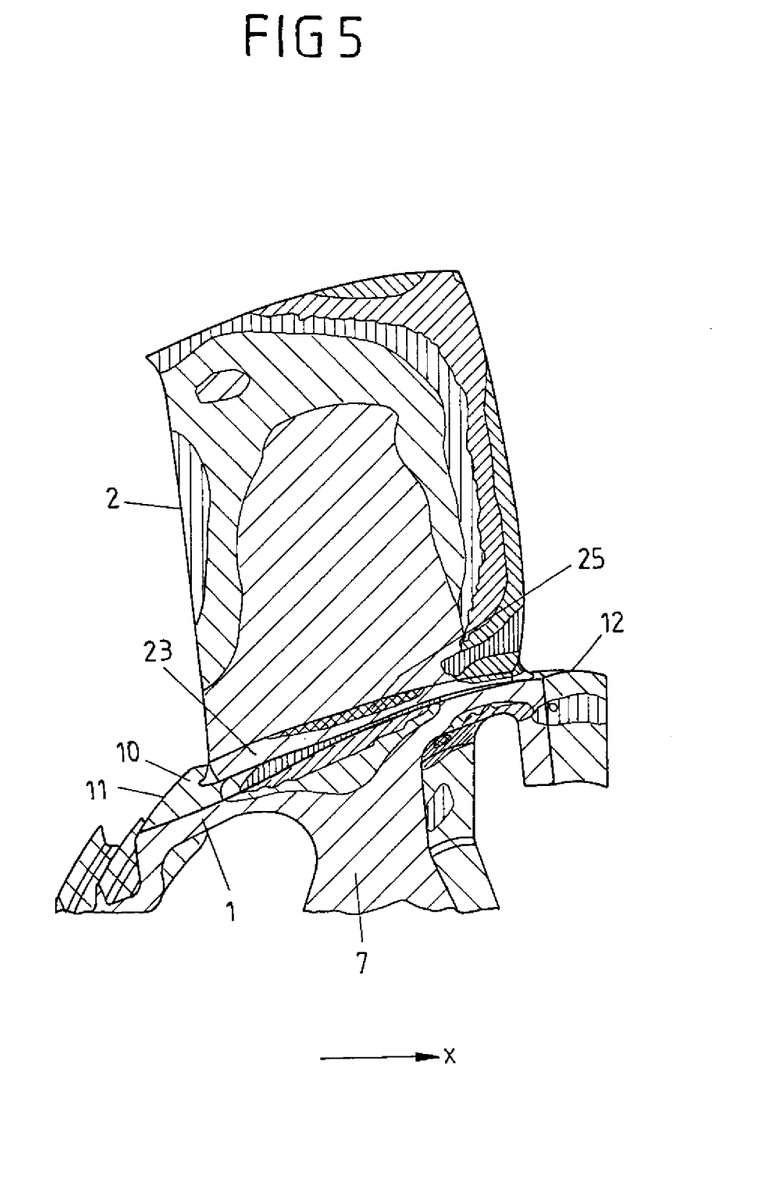
FIG. 5 shows a partially sectional side view of a rotor blade arranged on the blade ring of a BLISK, with the stress distribution on the rotor blade and the blade ring being shown.

FIG. 5 shows the stress distribution on a rotor blade 2 and in the area of the blade ring 1 of a rotor made using BLISK technology. The ring surface 10, the axially front face 11, the axially rear face 12, the blade ring 1, the rotor assembly 7 designed as a disk and a rotor blade 2 can be discerned. A transitional area of curved design between the rotor blade 2 and the ring surface 10 is identified with the reference numeral 23.

The maximum stress is present here in the cross-hatched area 25, i.e. in a central area of the blade 2, which has a small radial clearance to the connection of the blade 2 to the blade ring 1.

Due to the three-dimensional structuring of the ring surface 10, it is possible to reduce unfavourable vibration modes in the rotor assembly 7 and in the rotor blades 2, including a reduction of coupled disk/blade modes. In a design variant, it can be achieved thanks to the three-dimensional contouring that the area 25 of maximum stress of the blade 2 on the pressure side and on the suction side of the blade 2 is distributed more evenly.

Figure 6:
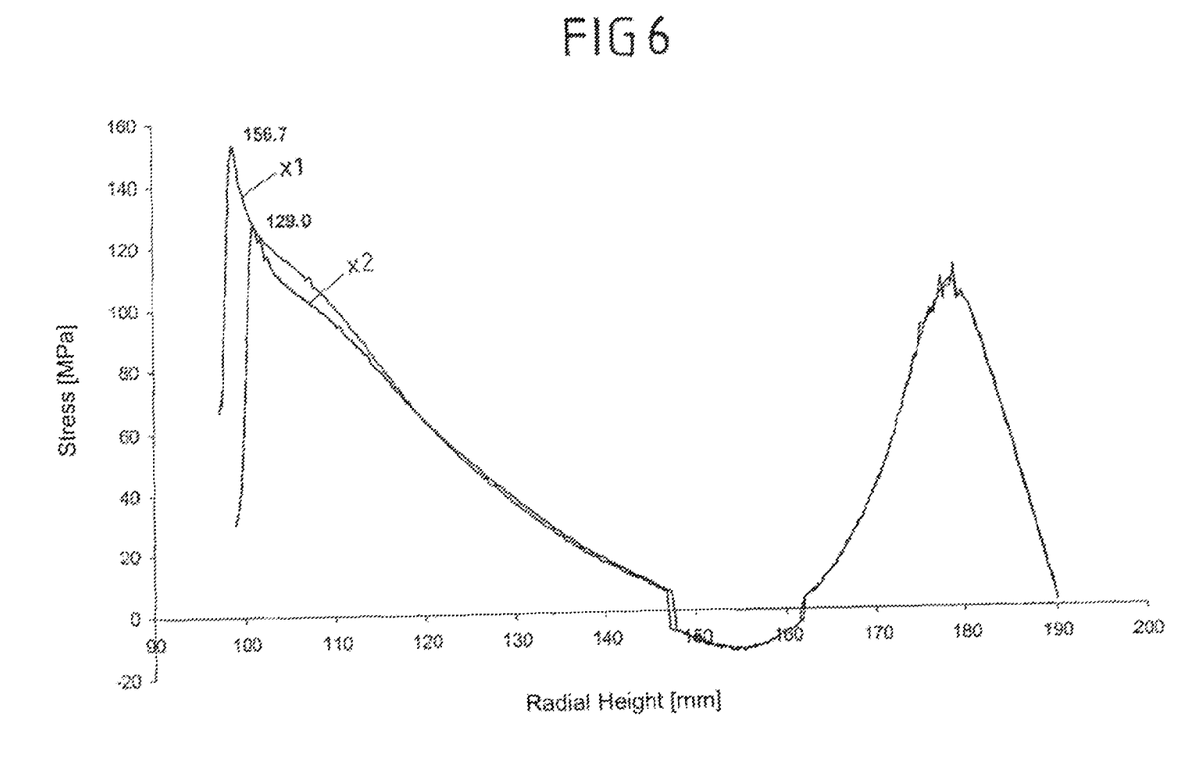
FIG. 6 shows a first diagram showing the mechanical stress on the outer edge of the blade pressure side of a rotor designed in accordance with the present invention in comparison with a conventionally designed rotor.
Figure 7:
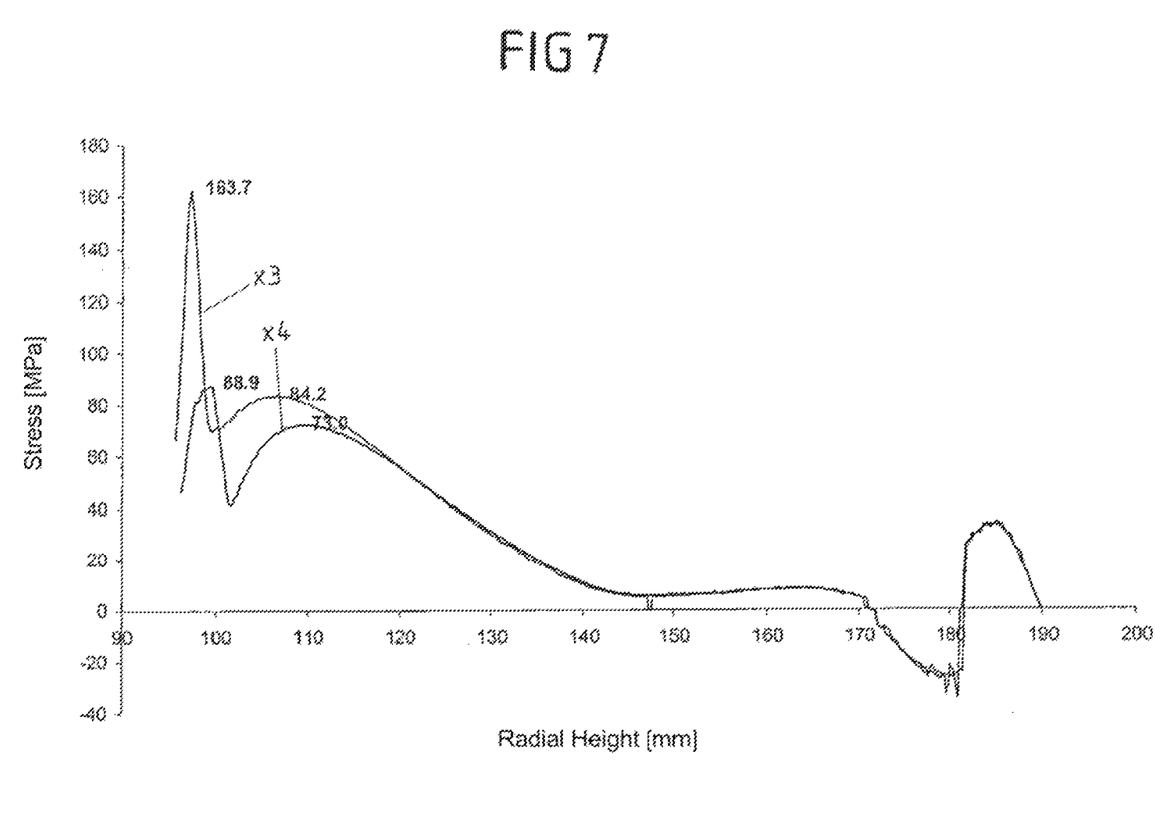
FIG. 7 shows a second diagram showing the mechanical stress on the outer edge of the blade suction side of a rotor designed in accordance with the present invention in comparison with a conventionally designed rotor.

The advantages entailed by the three-dimensional contouring of the ring surface 10 are shown as examples by FIGS. 6 and 7. FIG. 6 shows the mechanical stress on the outer edge of the pressure side of a rotor blade with three-dimensionally contoured ring surface, in comparison with the corresponding stress in a conventionally designed rotor with constant radius in the area of the ring surface. FIG. 7 shows the mechanical stress on the outer edge of the suction side of the blade, in comparison with a conventionally designed rotor.

It can be seen that the stress present in a rotor with three-dimensionally contoured ring surface (Graph X2 in FIG. 6 and Graph X4 in FIG. 7) is considerably lower than in a conventional rotor (Graph X1 in FIG. 6 and Graph X3 in FIG. 7). In particular, considerably reduced maximum values apply close to the connection to the blade ring, i.e. with a low radial height in the area of approx. 100 mm, where according to FIG. 5 the highest stresses occur. These are according to FIG. 6 129.0 MPa with a radial height of approx. 100 mm, compared with a value of 156.7 MPa in a rotor according to the state of the art. The same applies for the suction side shown in FIG. 7 with values of 88.9 MPa in comparison with 183.7 MPa and—with a second maximum at approx. 110 mm—with values of 73.0 MPa in comparison with 84.2 MPa.

The solution in accordance with the invention is restricted in its design not to the exemplary embodiments presented above, which must be understood merely as examples. In particular, the forms shown of the three-dimensional contouring of the blade ring and of the rotor blades must be understood only as examples. It is also pointed out that a three-dimensional contouring does not have to be provided in the entire area between two rotor blades, but can also be provided only in partial areas. The use of a rotor in accordance with the invention is furthermore not restricted to a jet engine. It can also be used in axial compressor stages of other turbomachines.

What is claimed is:

1. A rotor of an axial compressor stage of a turbomachine, comprising:
  a rotor assembly including a rotary axis, a circumference, and a blade ring with a radially outer ring surface formed on the circumference, and
  a plurality of rotor blades arranged on the blade ring,
  wherein the ring surface has at least in an area between two adjacent rotor blades of the plurality of rotor blades, a changing radius relative to the rotary axis of the rotor assembly both in an axial direction and in a circumferential direction;
  wherein, in the area between two adjacent rotor blades, the ring surface is shaped to have a resultant surface line including a concave depression positioned toward an axially front face of the blade ring transitioning to a convex bulge positioned toward an axially rear face of the blade ring;

wherein, the convex bulge includes a peak spaced circumferentially apart from both a suction side surface of one of the two adjacent rotor blades and an opposing pressure side surface of another of the two adjacent rotor blades, the peak positioned closer to the suction side surface;

wherein, in the area between two adjacent rotor blades where the ring surface is shaped with the concave depression and the convex bulge, a second surface line of a section through the blade ring in a plane normal to the rotary axis conforms to a mathematical function including at least one chosen from: a sine function, a cosine function and a combination of sine and cosine functions;

wherein, in the area between two adjacent rotor blades, every section through the blade ring in a further plane normal to the rotary axis has a surface line defined by at least one chosen from: a sine function, a cosine function and a combination of sine and cosine functions.

2. The rotor in accordance with claim 1, wherein for at least one section through the blade ring in a plane normal to the rotary axis, a resulting surface line in the area between two rotor blades has at least in some sections a steadily changing radius.

3. The rotor in accordance with claim 1, wherein for at least one section through the blade ring in a plane normal to the rotary axis, a resulting surface line in the area between two rotor blades is asymmetrical.

4. The rotor in accordance with claim 3, wherein the ring surface between the two adjacent rotor blades is shaped to have higher radii adjoining a suction side of one of the two adjacent rotor blades than adjoining a pressure side of another of the two adjacent rotor blades.

5. The rotor in accordance with claim 1, wherein for at least one longitudinal section through the blade ring, a resulting surface line between an axially front face and an axially rear face has at least in some sections a steadily changing radius.

6. The rotor in accordance with claim 1, wherein a course of a radius of the ring surface is parameterized by at least one chosen from an amplitude and a phase position of a trigonometric function or of several trigonometric functions superimposed one over another, with values for the amplitude and the phase position depending on a circumferential angle and axial position.

7. The rotor in accordance with claim 6, wherein not more than five trigonometric functions are used for the definition of the three-dimensional contour of the ring surface.

8. The rotor in accordance with claim 1, wherein the blade ring on an axially front face and/or an axially rear face has a circular shape.

9. The rotor in accordance with claim 1, wherein the ring surface between all rotor blades of the rotor has a same three-dimensional contour.

10. The rotor in accordance with claim 1, wherein the rotor assembly is designed as a disk with rotor blades attached thereto.

11. The rotor in accordance with claim 1, wherein the rotor assembly is designed as a BLISK with rotor blades being configured in one piece with the rotor assembly.

12. The rotor in accordance with claim 1, wherein the concave depression is positioned nearer the suction side surface than the pressure side surface.

13. The rotor in accordance with claim 1,
wherein for at least one longitudinal section through the blade ring, a resulting surface line between an axial start value and an axial end value has a steadily changing radius, and wherein the axial start value, in the axial direction, is positioned upstream of leading edges of the rotor blades and wherein the axial end value, in the axial direction, is positioned downstream of trailing edges of the rotor blades; and
wherein the ring surface between the axial start value and the downstream leading edges of the rotor blades, and also between the trailing edges of the rotor blades and the downstream axial end value, includes the changing radius relative to the rotary axis in the circumferential direction.

14. The rotor in accordance with claim 1, wherein a third surface line of a section through the blade ring in a plane normal to the rotary axis at the convex bulge and a fourth surface line of a section through the blade ring in a plane normal to the rotary axis at the concave depression conform to a mathematical function including at least one chosen from: a sine function, a cosine function and a combination of sine and cosine functions.

* * * * *